(12) United States Patent
Wilson et al.

(10) Patent No.: US 8,502,795 B2
(45) Date of Patent: *Aug. 6, 2013

(54) PHYSICS SIMULATION-BASED INTERACTION FOR SURFACE COMPUTING

(75) Inventors: Andrew David Wilson, Seattle, WA (US); Shahram Izadi, Cambridge (GB); Armando Garcia-Mendoza, Cambridge (GB); David Kirk, Cambridgeshire (GB); Otmar Hilliges, Munich (DE)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/408,972

(22) Filed: Feb. 29, 2012

(65) Prior Publication Data

US 2012/0162117 A1 Jun. 28, 2012

Related U.S. Application Data

(63) Continuation of application No. 12/203,350, filed on Sep. 3, 2008, now Pat. No. 8,154,524.

(60) Provisional application No. 61/075,034, filed on Jun. 24, 2008.

(51) Int. Cl.
*G06F 3/041* (2006.01)

(52) U.S. Cl.
USPC ............. 345/173; 463/30; 178/18.01

(58) Field of Classification Search
USPC ............ 345/173–178; 178/18.01–18.09, 178/18.11; 463/30; 340/4.12, 407.1, 407.2
See application file for complete search history.

(56) References Cited

U.S. PATENT DOCUMENTS

| | | | |
|---|---|---|---|
| 5,910,902 A | 6/1999 | Molvig et al. | |
| 6,111,582 A | 8/2000 | Jenkins | |
| 6,353,850 B1 * | 3/2002 | Wies et al. | 709/203 |
| 7,339,580 B2 | 3/2008 | Westerman et al. | |
| 7,345,675 B1 | 3/2008 | Minakuchi et al. | |
| 7,347,780 B1 | 3/2008 | Best | |
| 7,362,314 B2 | 4/2008 | Lapstun et al. | |
| 2002/0133264 A1 | 9/2002 | Maiteh et al. | |
| 2004/0108995 A1 | 6/2004 | Hoshino et al. | |
| 2004/0160577 A1 | 8/2004 | Baba et al. | |
| 2006/0031786 A1 | 2/2006 | Hillis et al. | |

(Continued)

OTHER PUBLICATIONS

Bishop, "Microsoft Surface Brings Computing to the Table," Seattle Post-Intelligencer, Business Section, May 30, 2007, available at <<http://www.seattlepi.com/business/317737_msftdevice30.html>>, 5 pages.

(Continued)

*Primary Examiner* — Stephen Sherman
(74) *Attorney, Agent, or Firm* — Lee & Hayes, PLLC

(57) ABSTRACT

The claimed subject matter provides a system and/or a method that facilitates enhancing interactive surface technologies for data manipulation. A surface detection component can employ a multiple contact surfacing technology to detect a surface input, wherein the detected surface input enables a physical interaction with a portion of displayed data that represents a corporeal object. A physics engine can integrate a portion of Newtonian physics into the interaction with the portion of displayed data in order to model at least one quantity related associated with the corporeal object, the quantity is at least one of a force, a mass, a velocity, or a friction.

20 Claims, 10 Drawing Sheets

U.S. PATENT DOCUMENTS

| | | | |
|---|---|---|---|
| 2006/0132456 | A1 | 6/2006 | Anson |
| 2006/0236263 | A1* | 10/2006 | Bathiche et al. ............ 715/786 |
| 2006/0277466 | A1 | 12/2006 | Anderson |
| 2007/0129152 | A1 | 6/2007 | Tsai et al. |
| 2007/0239409 | A1 | 10/2007 | Alan |
| 2008/0125224 | A1 | 5/2008 | Pollatsek |
| 2009/0315839 | A1 | 12/2009 | Wilson et al. |

OTHER PUBLICATIONS

"Crave TV: Hitachi StarBoard Interactive Surface," Jan. 2008, available at <<http://web.archive.org/web/20080120072504/http://crave.cnet.co.uk/video/0,139101587,49295106,00.htm>>, 13 pages.

"High-Performance Physical Simulations on Next-Generation Architecture with Many Cores," Intel Corporation, Intel Technology Journal, Aug. 22, 2007, vol. 11, Issue 3, available at <<http://www.intel.com/technology/itj/2007/v11i3/8-simulations/3-pipeline.htm>>, 3 pages.

Lee et al., "A Multi-Touch Three Dimensional Touch-Sensitive Tablet," ACM SIGCHI Bulletin, 1985, vol. 16, Issue 4, pp. 21-25.

"Microsoft Surface: Interactive Multi Touch Tabletop Computer Revealed," retrieved on May 27, 2008 at <<http://technabob.com/blog/2007/05/29/microsoft-surface-interactive-touch-computing-tech-revealed/>>, 11 pages.

Office Action for U.S. Appl. No. 12/203,350, mailed on Sep. 8, 2011, Andrew D. Wilson, "Physics Simulation-Based Interaction for Surface Computing," 15 pages.

* cited by examiner

PHYSICS SIMULATION-BASED INTERACTION FOR SURFACE COMPUTING

CROSS REFERENCE TO RELATED APPLICATION(S)

This application is a continuation of U.S. patent application Ser. No. 12/203,350 filed on Sep. 3, 2008, which claims the benefit of U.S. Provisional Patent Application Ser. No. 61/075,034, entitled "PHYSICS SIMULATION-BASED INTERACTION FOR SURFACE COMPUTING" which was filed Jun. 24, 2008, and all of which are incorporated herein by reference.

BACKGROUND

Computing devices are increasing in technological ability wherein such devices can provide a plurality of functionality within a limited device-space. Computing devices can be, but not limited to, mobile communication devices, desktop computers, laptops, cell phones, PDA, pagers, tablets, messenger devices, hand-helds, pocket translators, bar code scanners, smart phones, scanners, portable handheld scanners, and any other computing device that allows data interaction. Although each device employs a specific function for a user, devices have been developing to allow overlapping functionality in order to appeal to consumer needs. In other words, computing devices have incorporated a plurality of features and/or applications such that the devices have invaded one another's functionality. For example, cell phones can provide cellular service, phonebooks, calendars, games, voicemail, paging, web browsing, video capture, image capture, voice memos, voice recognition, high-end mobile phones (e.g., smart-phones becoming increasingly similar to portable computers/laptops in features and functionality), etc.

As a result, personal computing devices have incorporated a variety of techniques and/or methods for inputting information. Personal computing devices facilitate entering information employing devices such as, but not limited to, keyboards, keypads, touch pads, touch-screens, speakers, stylus' (e.g., wands), writing pads, etc. However, input devices such as keypads, speakers and writing pads bring forth user personalization deficiencies in which each user can not utilize the data entry technique (e.g., voice, and/or writing) similarly. For example, consumers employing writing recognition in the United States can write in English, yet have distinct and/or different letter variations.

Of the various input techniques and/or methods, surface computing can enable users to manipulate data with physical contact or interaction. For example, an object can be displayed and surface computing or surface technologies can allow a user to move, edit, or interact with the object with his or her hands. However, as the amount of data interaction and abilities increase with surface computing or surface technologies, users typically prefer an interaction with data that is substantially similar to one in the real world.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate incorporating physics into surface computing and data interaction. A surface detection component can dynamically detect a surface input and incorporate physic simulations to such surface inputs with a physics engine. In general, the surface input can be employed in order to interact with displayed data, wherein the physics engine can apply physic simulation modeling in regards to quantities such as mass, velocity, and/or friction. In particular, the physics engine can generate a plurality of proxy objects for a contour of a detected surface input. The physics engine can further apply physic simulation updates between a first frame and a second frame in order to provide interaction with displayed data.

In accordance with another aspect of the subject innovation, a flow component can provide motion calculations for surface inputs in order to provide motion tracking. Moreover, a manipulator can provide manipulation fidelity (e.g., exposure of collisions, against hand contours and fingers with static and kinetic frictions provide high fidelity, etc.), gathering (e.g., enabling the manipulation of more than one object at one time, etc.), manipulating objects in 3D, providing cloth and soft bodies (e.g., providing non-rigid objects, soft body simulation, cloth simulation, fluid simulation, etc.). In other aspects of the claimed subject matter, methods are provided that facilitate applying a physics quantity to an interaction between a data representation of a corporeal object and a surface input.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
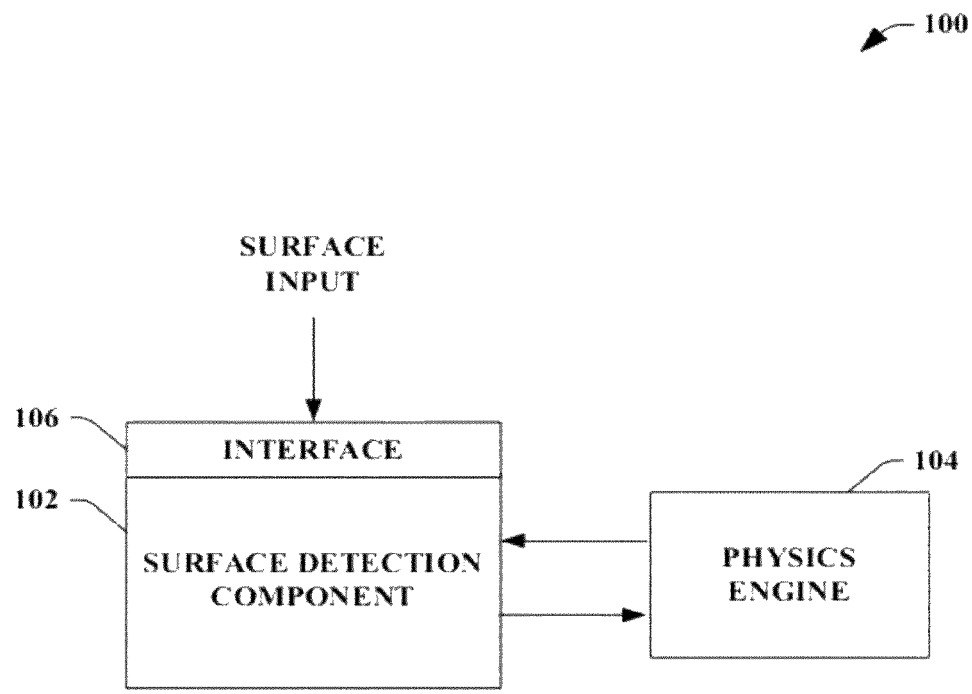
FIG. 1 illustrates a block diagram of an exemplary system that facilitates incorporating physics into surface computing and data interaction.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "engine," "manipulator" and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates incorporating physics into surface computing and data interaction. The system 100 can include a surface detection component 102 that can detect a surface input via an interface component 106 in order to enable an interaction with a portion of data. The system can further include a physics engine 104 that can apply a physic-based simulation for at least one quantity, wherein the quantity is at least one of force, mass, velocity, or friction. In other words, the physics engine 104 can provide realistic physic simulations in connection with data interaction and/or a surface input related to a portion of displayed data.

For example, a portion of data can be displayed in which a user can interact therewith. In particular, a user can provide surface inputs (e.g., touch events, hand gestures, etc.) in order to manipulate the portion of displayed data. For instance, a corporeal object can be displayed such as a cube, wherein a user can utilize surface inputs detected by surface computing in order to manipulate (e.g., move, delete, shrink, enlarge, rotate, etc.) the cube. The claimed subject matter can allow such manipulations to have real-world physic characteristics associated with force, mass, velocity, friction, etc.

In another example, a bolt and a nut can be graphically represented and displayed in which a user can grab and interact with the any of such graphically displayed objects. In accordance with the claimed subject matter, the physics engine 104 can provide physics quantities (e.g., forces, torque, gravity, mass, velocity, etc.) to the objects and/or interactions with such objects. Thus, a user can grab the nut and attempt to screw such nut on the bolt with real-world physic quantities associated therewith.

The system 100 can be utilized in order to capture touch events, surface inputs, and/or surface contacts related to a portion of displayed data. It is to be appreciated that such captured or detected events, inputs, or contacts can be gestures, hand-motions, hand interactions, object interactions, and/or any other interaction with a portion of data representative of a corporeal object. For example, hand interactions can be translated into corresponding data interactions on a display. In particular, a user can physically manipulate a portion of displayed data in which such hand gesture can be detected and translated in order for data interaction. Thus, touch event detection can be implemented by the surface detection component 102. It is to be appreciated that a touch event can be any physical interaction, a portion of displayed data, a detected surface input, and/or any suitable combination thereof.

In addition, the system 100 can include any suitable and/or necessary interface component 106 (herein referred to as "interface 106"), which provides various adapters, connectors, channels, communication paths, etc. to integrate the surface detection component 102 and/or the physics engine 104 into virtually any operating and/or database system(s) and/or with one another. In addition, the interface 106 can provide various adapters, connectors, channels, communication paths, etc., that provide for interaction with the surface detection component 102, the physics engine 104, the surface input, and any other device and/or component associated with the system 100.

Figure 2:
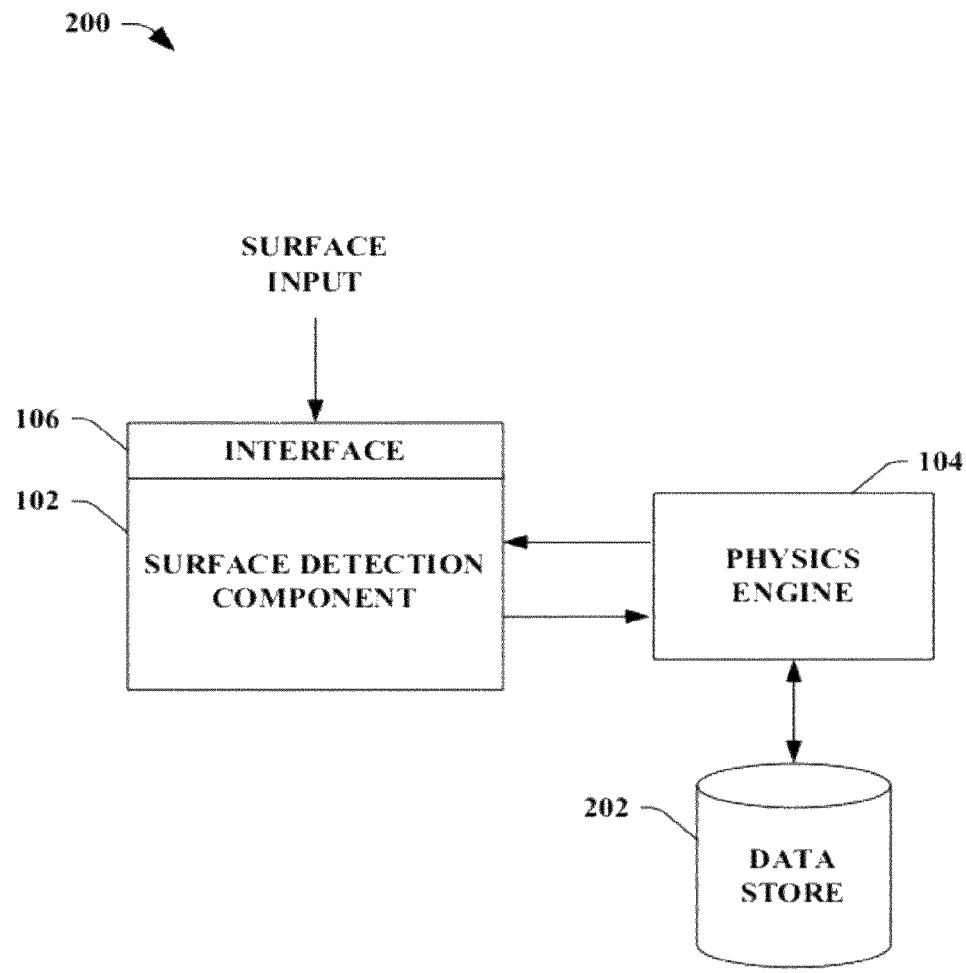
FIG. 2 illustrates a block diagram of an exemplary system that facilitates applying a physics quantity to an interaction between a data representation of a corporeal object and a surface input.

FIG. 2 illustrates a system 200 that facilitates applying a physics quantity to an interaction between a data representation of a corporeal object and a surface input. The system 200 can further include a data store 204 that can include any suitable data related to the surface detection component 102, the physics engine 104, surface input, etc. For example, the data store 204 can include, but not limited to including, physic quantities, physic characteristics, physic properties, physic equations, user preferences, user passwords, usernames, mappings, image processing data, image processing techniques, binarization data, physics data, proxy object data, particle proxy data, flow data, manipulation data, etc.

It is to be appreciated that the data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 204 can be a server, a database, a hard drive, a pen drive, an external hard drive, a portable hard drive, and the like.

Figure 3:
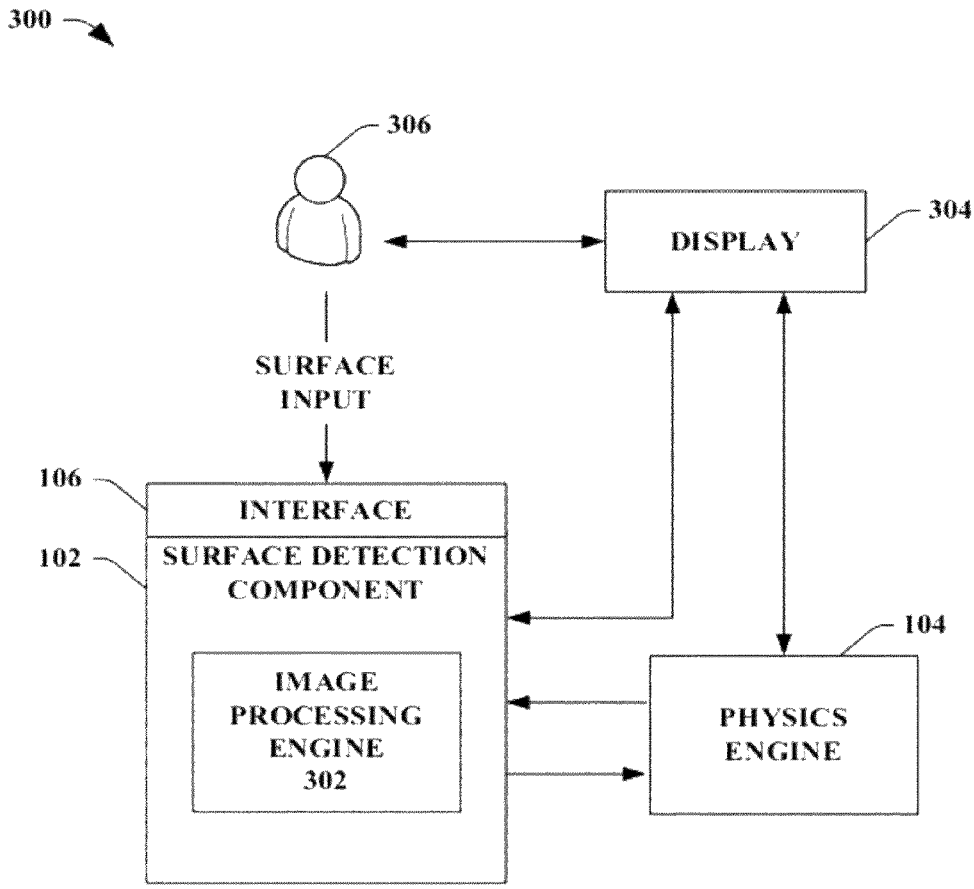
FIG. 3 illustrates a block diagram of an exemplary system that facilitates providing enhanced surface computing for a user manipulating a portion of displayed data.

FIG. 3 illustrates a system 300 that facilitates providing enhanced surface computing for a user manipulating a portion of displayed data. The system 300 can include an image processing component 302 that can utilize any suitable image processing technique in order to bring the collected surface input from a user 306 into alignment with a projected image on a display 304. For instance, a surface input can be detected and a corresponding point in the projected image on the display 304 can be calculated. In another example, a user's hands or fingers can be placed on a surface to which interaction with displayed data can be performed. In this example, the fingers or hands can manipulate the portion of displayed data in which such data can respond with physics-accurate results (e.g., force, mass, velocity, friction, etc.). For instance, the image processing component 302 can employ binarization, image analysis, captured image analysis, etc. Moreover, it is to be appreciated that the display 304 can be any suitable display component such as, but not limited to, a monitor, a television, a liquid crystal display (LCD), a plasma, a rear-projection display, a front-projection display, a cathode ray tube (CRT) monitor, a flat-panel, a display for a computing device, a portable digital assistance (PDA) screen, a laptop display, a computer monitor, a smartphone display, a cellular device screen, a mobile communication device display, a portable gaming device display, etc.

Figure 4:
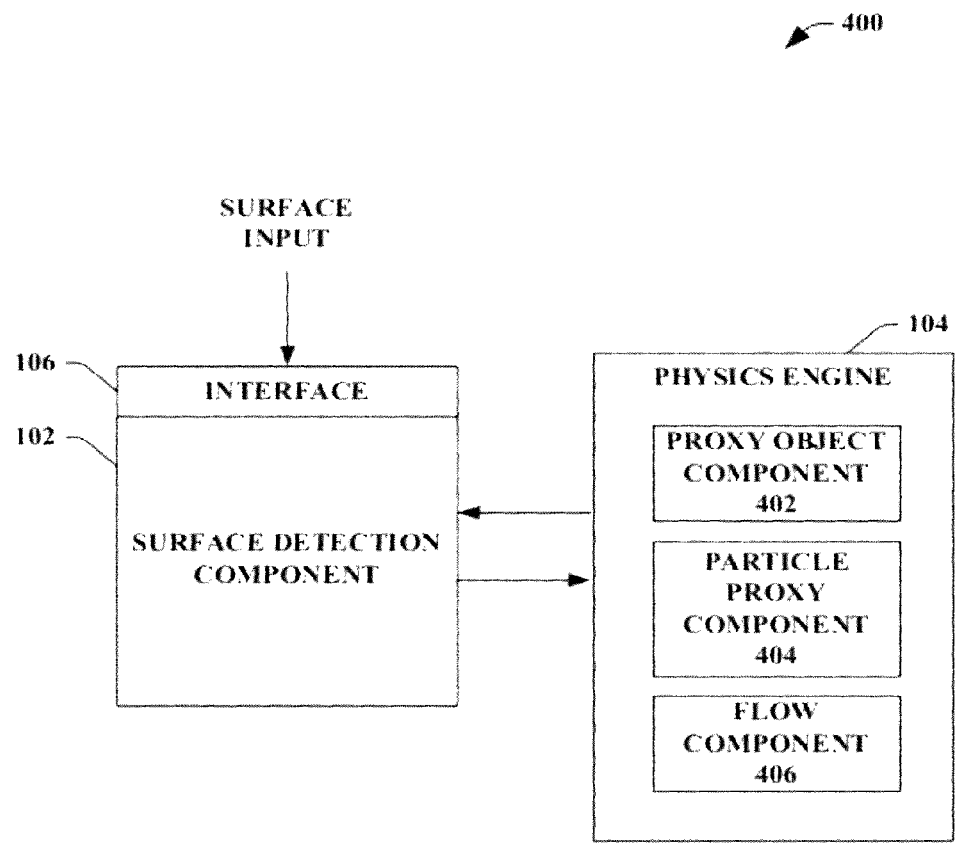
FIG. 4 illustrates a block diagram of an exemplary system that facilitates replicating Newtonian physics with data interaction associated with surface computing.

FIG. 4 illustrates a system 400 that facilitates replicating Newtonian physics with data interaction associated with surface computing. The system 400 can include a proxy object component 402 that can incorporate the surface input into a physics simulation by creating a proxy object for each surface input detected. The system 400 can further include a particle proxy component 404 that models a shape of the surface input with a plurality of proxy objects places along a contour of the surface input, the contour of proxy objects is a particular proxy. The system 400 can further include a flow component 406 that can calculate a motion of a particle proxy by tracking motion between a first frame and a second frame.

The subject innovation can explore the intersection between emerging surface technologies, capable of sensing multiple contacts and even shape information, and advanced games physics engines. A powerful and novel technique is defined for modeling the data sensed from such surfaces as input within a physics simulation. This affords a user the ability to interact with digital objects in ways analogous to manipulation of real objects. The subject innovation can provide a technique that is capable of modeling both multiple contact points and more sophisticated shape information, such as the entire hand or other physical objects, and of mapping this user input to friction and collision forces within the physics world. This enables a variety of fine-grained and casual interactions, supporting finger-based, whole-hand, and tangible input. The technique can be used to add real-world dynamics to interactive surfaces (e.g., a vision-based table-top, etc.), creating a fluid and natural experience. This approach can hide many of the complexities inherent in using physics engines from application developers, allowing applications to be created without preprogramming interaction behavior or gesture recognition.

One of the appeals of emerging interactive surface technologies is that they allow people to interact with the digital by directly touching and manipulating content on the screen. People who use such systems often comment that this ability to reach out and touch digital content adds a physical or tangible quality to the interaction, making the virtual feel more real. Many interactive surface-based applications attempt to further highlight this—pseudo-physicality by carefully designing interface objects that exhibit a sense of real-world behavior. One such example is the rotate and translate behavior found in tabletop applications, where the interaction is analogous to moving a real sheet of paper on a flat surface with one or more fingers. Although the response of such an interaction may feel realistic, this behavior is very much preprogrammed For example, how the digital photo rotates or translates is predefined by existing interaction logic. Such techniques thus possess an inherent scripted nature which may break down once the user interacts with the system in ways unanticipated by the developer.

The subject innovation provides a different approach for supporting pseudo-physical interactions on emerging surface technologies (e.g., systems that are capable of sensing multiple touch points and/or even more sophisticated shape information). Specifically, physics engines used in computer games that simulate Newtonian physics can be utilized, thus enabling interaction with digital objects by modeling quantities such as, but not limited to, force, mass, velocity, friction, torque, and/or any other suitable physics quantity or measurement. Such engines can allow a user to control and manipulate digital objects through richer sets of parameters more analogous to interactions in the real world.

While physics engines are comprehensive, such engines can be complex to master. Many coefficients and parameters can be exposed to application developers, and modeling user input is non-trivial, particularly for data beyond a single contact point. The subject innovation can provide a powerful technique for modeling rich data, sensed from surface technologies, as input within the physics simulation. The claimed subject matter can model one or more contact points, such as those sensed from a multi-touch surface, and can also scale to represent more sophisticated shapes such as outlines of the whole hand or tangible objects near the surface. This can allow the user to interact and control objects by exerting forces such as friction and collision, but avoid exposing users and application programmers to the complexities of the physics engine (e.g., physics engine 104).

By combining this technique with a gaming physics engine and a vision-based interactive surface, real-world dynamics can be added to digital applications. The claimed subject matter can create natural and fluid physics-based interactions without the need either to explicitly program this behavior into the system or to recognize gestures. The ability of advanced physics simulators to enable user interaction with more complex materials such as soft bodies and clothes is further provided.

The subject innovation further explores the tradeoffs of alternative approaches experimented with in developing such above discussed techniques. The claimed subject matter can allow practitioners to understand the nuances of each approach so that they may further explore the intersection between surfaces and physics. Moreover, early experiences with using such technique in practice are explored.

Interactive surface technology can vary widely. Both resistive and capacitive single and multi-touch systems can be demonstrated, as well as computer vision systems capable of imaging fingertips and more sophisticated shape information, such as the entire hand or other physical objects. The subject innovation can support such broad surface input rather than develop a technique tailored to one technology.

Contact information on interactive surfaces (e.g., a fingertip touching the surface) can be represented as discrete 2D points. Even if more information about the shape of the contact is available, neighboring sensor pixels can be grouped into contiguous regions or connected components. In many cases, each distinct contact can lead to a component, which in turn leads to a single 2D point—the computed centre of mass of that particular component. This approach thus condenses each contact to a point-based representation, irrespective of its shape.

Single and multi-point-based input models used by so many surface technologies can be supported. However, there are advantages to supporting more sophisticated shape representations if the requisite data is available. Contact point (which has become synonymous with 2D touch points) can be defined more broadly to define not only fingertip but also other contact shapes such as the palm of the hand or even tangible objects.

One higher fidelity approach for computing more data about a contact shape can be to determine the major and minor axes of the pixels in each component in order to obtain an ellipse model that approximately fits the shape. This works well for elliptically shaped contacts (e.g., fingertips), but can be less effective for complex shapes. Alternatively, the shape can be represented more precisely as a polygon mesh by calculating each contact's contour, represented as a closed path. Another technique is to take pixels lying near the contour by computing the spatial gradient using a filter (e.g., Sobel, etc.).

Such approaches enable more sophisticated representations of user input to be supported. This broad fidelity of input with advanced physics simulations can allow an expansion of the vocabulary with which digital objects can be manipulated. For instance, the claimed subject matter can make manipulation of digital objects less scripted, using rich and varied interaction techniques and strategies.

The physics engine 104 can enable the creation of real-world mechanics and behavior in graphical applications while hiding computational complexity. The physics engine 104 can employ many physics concepts such as, but not limited to, acceleration, momentum, forces, friction, torque, collisions, etc. In addition to rigid bodies, many systems model particles (e.g., for smoke, dust, and the like), fluids, hair, clothes, etc. Virtual joints and springs can give rag doll characters and vehicles the appropriate flexibility and resistance, and materials can be programmed with specific properties—so that ice is slick, for instance. The claimed subject matter can relate to contact forces, such as those due to collisions and friction between simulated bodies.

The handling of collisions can be divided into collision detection, the determination of whether rigid bodies are in contact, and collision response, the application of appropriate forces if they are in contact. For example, the collision of a cube falling on the floor may be detected by considering the intersection of the faces defining the cube with those of the floor. The change in motion of the cube as a result (e.g., the response) is a function of mass, inertia, velocity, and point of contact with the floor, among other factors.

Friction forces can describe forces resisting motion when the surface of one body stays in contact with the surface of another. If the two surfaces are moving with respect to each other, kinetic friction can oppose the forces moving the bodies. If the two surfaces are at rest relative to each other, static friction can oppose forces that would otherwise lead to the motion of one of the objects.

In order to interact with virtual objects in the physics engine 104, surface contacts can be represented within the simulation. Such engine can have enormous potential and flexibility. Accordingly, there are many strategies for modeling surface input in the physics world. For example, the following are strategies: (1) Direct force—A contact point can be represented as a force without a geometric or visual representation applied at a particular point on an object. The force direction and magnitude can be calculated from the contact's velocity and size if available. (2) Virtual joints and springs—Each contact can be connected to virtual objects so that objects follow the contact point as long as it is on the surface. (3) Proxy objects—Contact points can be represented through solid geometric objects such as cubes or spheres. These objects are an approximation of the contact points touching the surface and interact with other virtual objects through collision and friction forces. (4) Particles—Where additional information about a contact's shape is available, multiple solid objects or particles can be combined to approximate the shape and motion of the contact more closely. This can allow for modeling of interaction with the whole hand or other transducers such as tangible objects. (5) Deformable 2D/3D Mesh—Another approach for modeling more sophisticated shapes is to construct 2D or even 3D meshes (if the data is available) based on features in the sensor data.

At first glance, it may appear that a deformable 3D mesh of the hand can achieve the highest degree of fidelity. But a number of difficulties exist with this approach. First, interactive surfaces provide sensing at or near the surface, not full 3D shape. Similarly, because the manipulated object exists on the (e.g., flat) projection surface, the 3D shape of the hand, if captured, would not conform to the object and so would not reflect the shape of a real hand grasping a real object. Finally, constructing such an animated mesh is difficult, requiring robust tracking of features and accurate deformation of the 3D object.

The subject innovation can provide solutions associated with finding a technique to simulate surface input within these advanced physics simulations. The claimed subject matter can relate to a novel Proxy/Particle technique that retains benefits of mesh-based representations—in particular, a high fidelity of interaction—but is considerably easier for application programmers to implement.

Within a physics simulation, an application can control the movement of a rigid body by applying one or more forces directly. For example, a spaceship in a game might have thrusters on either side of its body. The ship may be propelled forward by applying forward force at the location of both thrusters. If one of the forces is applied in the opposite direction, the ship will turn. Rotation is the byproduct of torque, which occurs when forces are applied off-center (of mass) because different—parts of the body are moving at different speeds.

From a programmer's point of view, this approach is different than moving the ship by setting its absolute position. The precise force and torque required to move the object into its target position can be calculated, a concept referred to as kinetic control. This method of positioning an object can ensure correct collision response with other bodies in the simulation. In comparison, directly setting the position of the body within a simulation can lead to unstable and unpredictable results. In some ways, absolute positioning would be analogous to teleporting a real object from one location to another. Issues such as interpenetration can arise where objects become partially embedded in each other.

Therefore, a strategy for moving an object on an interactive surface is to consider that each contact touching a rigid body imparts a friction force to the body according to the contact's motion (and presumed mass). These multiple friction forces can be applied to the body, as in the example of the spaceship discussed above. The problem with this approach is that to calculate the forces necessary to match a contact's movement, all other external forces acting on the body can be taken into account and counteracted. These can include friction forces and collision responses that are difficult or impossible for application developers to obtain.

This difficulty extends to considering forces corresponding to surface contacts. In the case of multiple contacts, the correct friction forces corresponding to each contact can be determined (e.g., simultaneously). Consider the case where one or more of the contacts exhibits static friction. Recall that static friction applies a force that counteracts forces that would otherwise lead to the body's motion. For example, if one contact pins an object so that it will rotate due to the motion of another contact, the application of correct friction force due to one of the contacts can require knowing the friction force due to the other.

In fact, at the heart of the physics engine 104 is a sophisticated constraint solver that addresses this issue. Without essentially constructing a new solver within the physics-engine, or without access to internals of the existing solver, it would seem impossible to correctly apply contact forces directly. Even if it were possible to change the solver or embed another, such an approach would go against the spirit of the claimed subject matter, wherein an existing full-featured physics engine is leveraged rather than built from scratch.

It seems at first that a solution is to treat frictions as kinetic. But this poses a problem in the pinning example as well. Because kinetic friction forces only act in the presence of relative motion, the counteracting force that keeps the pinned part of the object stationary can first move. Thus, this approach can result in a somewhat viscous and slightly unpredictable feel when moving objects.

Another kinetic approach is to connect virtual objects and an input contact using a joint. Think of this as an invisible piece of rope with a predefined length that is tied to the object at a particular anchor point. The object is then pulled around using this rope. Springs add elasticity, allowing the connection to stretch and spring back.

By attaching a joint off-center, the object is subject to both force and torque—allowing the object to move and rotate using a single connection. In the earlier example, one joint attached to the first contact point and one corner of the object can serve as pivotal point. Attaching another joint to an opposing corner and a contact point that describes an angular movement would cause the object to spin around the first contact point.

This approach may not be well suited for multiple simultaneous contact points, particularly ones pulling in opposite directions. In the real world, even the stiffest materials can absorb energy derived from opposing forces through deformations of their atomic structure. This may not be possible in physics simulations where all calculations can be performed using the center of mass and an inertia tensor modeling the effect of mass. The actual body and its volume are used for collision detection and rendering, and may not be manipulated based on dynamics calculations. Thus, a set of forces that would usually deform a rigid object or rip it apart can result in an unstable system—typically causing the object to oscillate rapidly and behave unpredictably.

Springs can in part alleviate some of these issues by providing more flex in the connection. However, a trade-off exists between the elasticity of the spring and how responsive the connected object is to contact (e.g., springs should be fairly short and rigid to allow for a faster response). Another approach is to allow the joint or spring to break in these situations, but this can easily lead to situations where objects will fly out of the user's reach.

The two techniques described above can be employed in single-point physics-enabled applications, wherein such limitations were discussed in terms of modeling multiple contacts.

First, contacts may not be discrete 2D points, and it may be desirable to match the shape of the contact input closely. It is unclear how one would model more sophisticated shapes and contours with either of these approaches. Second, the above object-manipulation techniques address the case where the user touches the object directly, thereby moving the object by friction forces. Neither of these approaches addresses the movement of objects by collision forces (e.g., from contact forces applied to the side of the object).

The claimed subject matter provides a technique which addresses friction and collision forces in a framework and may be easily extended to handle shapes of arbitrary contour. In doing so, it addresses many of the difficulties of the previous techniques.

The system 400 can include a proxy object component 402 that can generate a proxy object in accordance with the subject innovation. A proxy object's approach for incorporating surface input into a physics simulation is to introduce rigid bodies into the simulation, one for each surface contact. These bodies are kinetically controlled to match the position of the surface contacts, and may interact with other rigid bodies in the scene either by collision or friction. Such proxy objects can be thought of as incarnations of contact points within the physics simulation.

This proxy approach can carry various benefits such as hiding the complexity of force calculations (in fact, hiding most physics aspects) from the programmer, while avoiding the difficulties of the previously described approaches. It leverages collision as well as friction forces (e.g., static, kinetic, etc.) to model rich interactions such as, but not limited to, pushing, grabbing, pinching, dragging, etc. Proxy objects can interact with other objects in the simulation through the techniques provided by the physics engine 104. Moreover, this approach can avoid unnecessary strain on the solver (e.g., inserting extreme force values) and resulting unstable simulation states.

Proxy objects are created and positioned for each point of contact. A single shape primitive such as a cube or sphere can be used for each contact. When a contact initially appears, a ray casting calculation is performed to determine the position and height of the proxy so that it touches the underlying object. In another example, a sphere or cube can be used as a proxy shape to create a thin capsule, box, or cylinder which stretches from the 3D camera near plane to the surface of the touched object. This kind of proxy can collide not only with objects resting on the same plane as the touched object (e.g., the floor, etc.), but also objects that are in midair, or stacked on other objects (e.g., other planes). Such behavior can correspond more closely to what a user expects.

As the sensing system (e.g., the surface detection component 102) provides updates to a contact position, the corresponding proxy object can be kinetically controlled to match the updated position. This is done by applying the necessary forces to bring the proxy object (of known mass) to the precise position. This scheme can allow users to leverage collision forces to push objects around or grab objects by touching them from two opposing sides.

A small change in the kinetic control can enable the proxy object to exert friction forces when it lies on top of another rigid body (as when the user touches the top surface of a virtual object, for example). In particular, forces tangential to the touched object can be applied to match the contact position. As with dynamic bodies, gravity can be included as an external force. In the case where gravity is directed into the table, the proxies thus exert downward force onto other objects and cause friction forces. This hybrid kinetic-dynamic control of the object can be implemented by direct addition of forces to the proxy rigid body, or by a prismatic joint constraint on the body's motion. The simulated weight of the finger on the object may be adjusted by changing the mass of the proxy object, while the material properties of the virtual objects may be adjusted by changing coefficients of static and kinetic friction.

An advantage of the proxy-object technique is that it leverages the built-in capability of the physics engine 104 to simulate both friction and collision contact forces. Moreover, because the calculation of contact forces can be handled by the built-in physics-engine solver (e.g., physic engine 104), the combined effect of simultaneous static and kinetic friction forces due to multiple proxy objects can be handled. These friction forces can enable users to translate and rotate objects (through opposing force directions) that are touched directly.

The system 400 can further include the particle proxy component 404. Each touch point can be approximated as a single proxy object. This enables a fast implementation, and lends itself to sensing systems that report only contact position and no shape information, as well as for applications that favor interaction with the tip of the index finger or stylus.

Some interactive surfaces can provide shape information, such as an oriented ellipse, bounding box or full polygonal contours. The idea of the particle proxy is to model the contact shape by a multitude of proxy objects (e.g., particles) placed along the contour of the detected contact. Particles can be added and removed as contours change size and shape. An example implementation can involve creating a new set of proxy objects for the contour at the beginning of each simulation frame, and destroying all proxy objects after the physics simulation has been updated. Even though the proxies can be destroyed after the physics update, each can enact collision and friction forces during the update.

The advantage of the particle proxy approach is twofold. First, collisions appear to be more correct because they closely follow the shape of the contact. This is particularly important when using the flat or side of the hand, tangible objects, or generally contacts other than fingertips. Moreover, the distribution and magnitude of friction forces on the top of an object can be accurately modeled. For example, the flat of the hand may exert more friction than the tip of a finger, by virtue of having more particles assigned to it. Likewise, a single contact turning in place can exert friction forces to rotate an object. Unlike the single proxy model, each particle can be placed (e.g., ray cast) separately, so that a contact can conform to irregularly-shaped 3D virtual objects.

As in the single proxy object model, each particle can be kinetically controlled to match the movement of the contact to which it belongs. Generally, the velocity of a point on the contour can be computed by examining the contact's contour at the previous frame. This calculation can be fast, as with an ellipse model, or more complex, as with a polygonal contour.

The system 400 can include the flow component 406. One issue in basing velocity calculations on tracked contacts is that tracking can fail, particularly when the user is using less constrained grasping postures such as the edge or flat of a hand rather than the more cursor-like index finger. In these cases, components can split and merge in ways that do not correspond to how the physical input is seen, leading to erroneous velocity calculations, and ultimately in the case of physics simulation, unpredictable motion.

An alternative approach can be to calculate the motion of the particle independently of tracked contact information. For example, local features of the image may instead be tracked from the previous frame to calculate velocity. Simple block matching of the sort used in optical flow is one such technique.

When using local motion estimates, the tracking of discrete contact objects and contours may then be avoided altogether by placing proxy particles at image locations with high spatial gradient (e.g., Sobel filter, etc.). These pixels can lie on or near contact contours.

The instantaneous, piecewise nature of the shape and motion calculations of the flow-based particle proxy method/technique possesses several advantages. First, the friction and contact forces lead to stable physics simulation results than if shape and motion were calculated from discrete tracked objects. Second, few limits are imposed on the manipulations a user may perform, whether leading to collisions, friction forces, or a combination thereof.

Firstly, while in the real world one might apply more or less force to control friction, the described systems may not have a sense of how hard the user is pressing. When using particle proxies, the amount of friction applied is instead proportional to the number of proxies applied to the object, which itself is related to the surface area of the touch. For example, a single finger moving across an object will apply less friction than multiple fingers. Moreover, a device can enable sensing surface-like pressure which can be transduced to force on the number of proxies.

A second issue can be that grasping a virtual object by placing two fingers or hands on either side can be difficult if not impossible in many of the techniques we have explored. Such manipulations require persistent resting contacts to be placed on virtual objects. The particle-based approach, in which each can be placed anew in every frame, would place the proxy corresponding to a grasping finger on top of the object, thus defeating attempts to grasp it. The single proxy object approach uses persistent proxies, and so allows grasping of an object resting on the floor. It may be possible to extend the particle approach to allow proxies to persist at a given depth when it seems appropriate, or to utilize a hybrid approach in which both the particle and single proxy techniques are used simultaneously.

For example, the described systems may be able to sense pressure by interpreting the gray levels of the input image as light touches or heavy touches. For proxy-based techniques, this could be implemented by changing the mass of the proxy. New range-sensing cameras providing per-pixel depth information may also be appropriate. Per-pixel depth can be used to construct a rich 3D model of the hand, opening new opportunities in modeling grasping behavior. It might also assist in grasping an object in order to lift it up and place it on another object.

The claimed subject matter can provide a number of techniques to incorporate interactive surface input primitives into a real-time physics simulation. The described techniques can take advantage of the fidelity of sensing provided by vision-based interactive surfaces, with the goal of enabling in a virtual domain the range of object manipulation strategies available to us in the real world.

Figure 5:
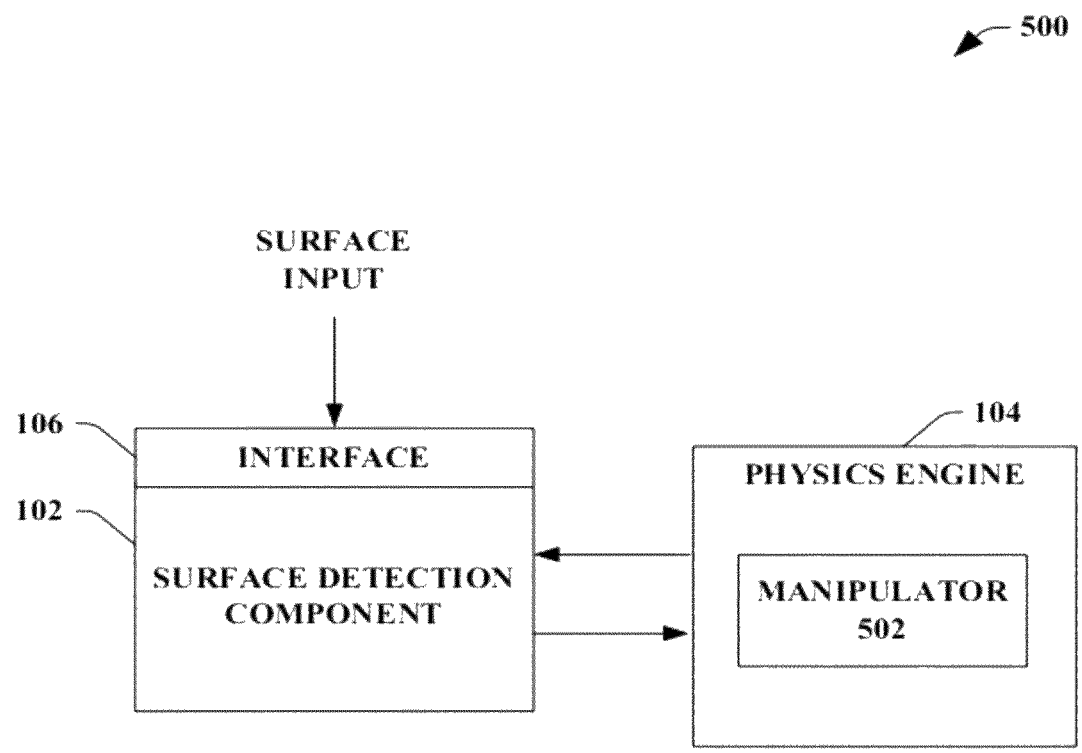
FIG. 5 illustrates a block diagram of exemplary system that facilitates enabling manipulation styles for surface technologies.

FIG. 5 illustrates a system 500 that facilitates enabling manipulation styles for surface technologies. The system 500 can include a manipulator that can provide at least one of a manipulation fidelity, a gathering, a manipulation of a 3-dimensional (3D) object, or a rigidity simulation. By providing more detailed surface input types into a physics simulation, the subject innovation can enable a wide variety of manipulation styles drawn from real-world experience. The claimed subject matter can provide at least one of manipulation fidelity, gathering, manipulating objects in 3D, cloth and soft bodies.

The ability to exploit detailed shape and motion information has consequences when considering the manipulation of objects. Free-moving virtual objects can be moved by one of a variety of strategies that combine collisions against the contours of hands and fingers with static and kinetic frictions. Based at least in part upon all three kinds of forces being employed simultaneously, the impression is one of unusually high fidelity. An example can be the manipulation of a ball that is free to roll on the surface: it may be compelled to roll, spin, stop or bounce in a surprisingly precise fashion, using a single light touch, multiple touches, or the flat of the hand for stopping power. Physical objects can also be integrated at no-cost allowing a variety of interesting tangible behaviors.

The manipulator 502 can provide the ability to sense and process contours, as well as distribute friction forces piecewise across the virtual space, which enables the manipulation of two or more objects at once, much as one might move a group of small objects spread across a table or surface. Users may use the edges of their hands (e.g., or even arms) to collide against many objects at once, or use the flats of multiple hands to apply friction forces. For interactive surfaces able to sense physical objects, an interesting possibility is to use a ruler or any other straight edged object to move and align multiple objects.

Modeling virtual objects and input in 3D enables interesting yet familiar interactions. For example, a small flat object resting on a larger flat object may be moved by tapping its side or applying friction. Depending on the masses and frictions involved, it may be necessary to hold the larger object in place. Clearly, the designer can tune masses, frictions and appearances to match the user's expectations with the manipulator 502.

If the interaction is limited to collision forces from the side and friction forces from the top, however, the manner in which a user may place the smaller object on top of another can be provided. Ramps, see-saws, and other constructions are possible, if somewhat contrived. In one example, it may be possible through the application of enough friction forces to one side of the object, to flip one object onto another.

When the objects to be stacked are thin, such as cards representing documents, one technique with the manipulator 502 is to give the top and bottom surfaces of each object a cambered shape that allows the user to raise one side by pressing down on the other. The user may then move another like-sized card under the tilted card. This behavior can correspond to our awareness that in the real world. Even flat objects such as, but not limited to, cards, paper, credit cards, etc. have some 3D shape that can be intuitively exploited for manipulation.

Rigid bodies such as boxes, spheres, and the like can explain the described interaction techniques. However, in the real world objects may not be rigid; instead, they can be soft, malleable, and can deform or dissolve upon force exertion. Examples can include, but are not limited to including, rubber, clothes, paper, plastics, soft metals, etc.

In addition to rigid body dynamics, the manipulator 502 can provide physics simulations that offer some form of support for soft body, cloth, and/or fluid simulation. As all interactions in the model associated with the claimed subject matter are conducted through collision or friction forces, it can be applied to arbitrary virtual objects. For example, it is possible to crumple a piece of cloth with a grasping interaction using all the fingers of one hand. That crumpled cloth can then be straightened by pushing down with the flat hand. One can even tear paper-like objects apart by applying forces in opposing directions on two corners.

Moreover, the manipulator 502 can allow soft volumetric bodies to be squished so as to fit into cavities or compressed so as to slide underneath other objects. Soft materials could also be used for terrains; deformation could be triggered by users digging their fingers into the terrain, using their whole hands to form valleys, or using a cupping gesture to create elevations. More open-ended and free-form interactions with particle systems (e.g., simulating sand) and fluids can be further provided (e.g., in a gaming context, etc.).

Figure 6:
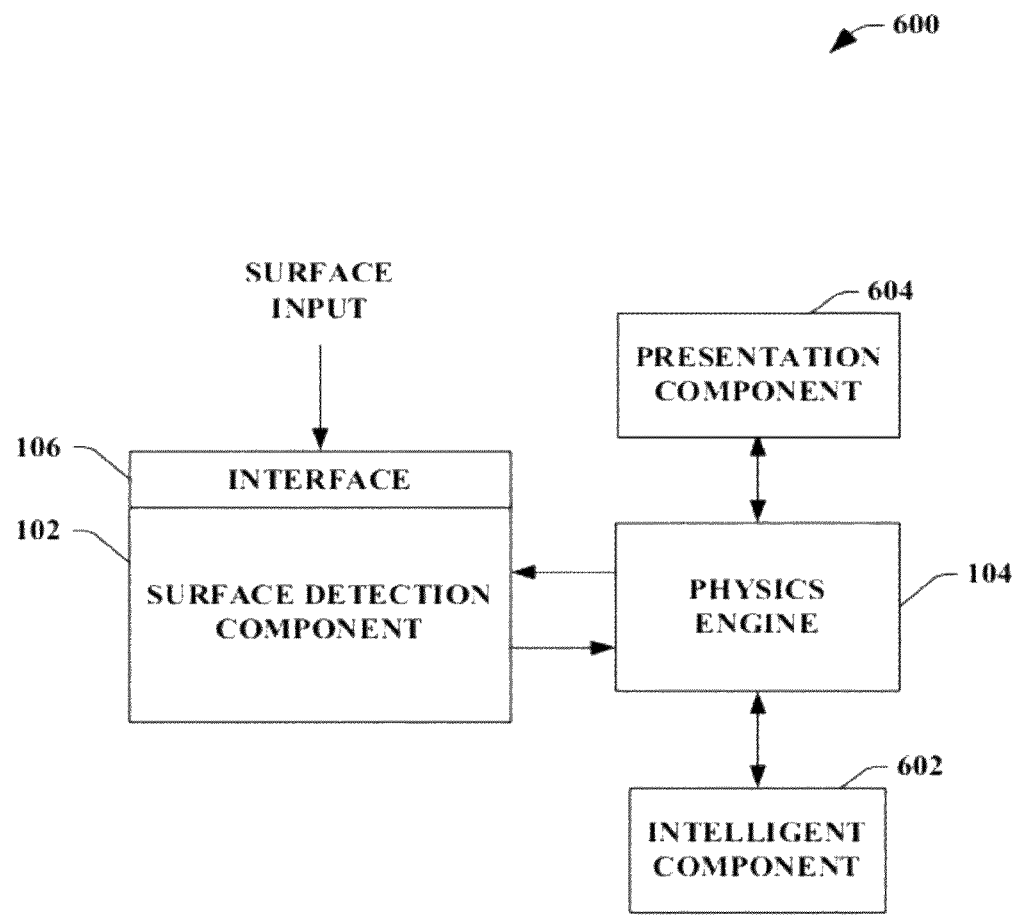
FIG. 6 illustrates a block diagram of an exemplary system that facilitates incorporating physics into surface computing and data interaction.

FIG. 6 illustrates a system 600 that employs intelligence to facilitate automatically incorporating physics into surface computing and data interaction. The system 600 can include the surface detection component 102, the physics engine 104, and the interface 106, which can be substantially similar to respective engines, components, and interfaces described in previous figures. The system 600 further includes an intelligent component 602. The intelligent component 602 can be utilized by the physics engine 104 to facilitate incorporating Newtonian physics and related properties to data interactions in connection with surface computing. For example, the intelligent component 602 can infer mass, force, velocity, friction, proxy objects, particle proxy, velocity calculations, data interactions, etc.

The intelligent component 602 can employ value of information (VOI) computation in order to identify quantities for object represented by displayed data. For instance, by utilizing VOI computation, the most ideal and/or appropriate physics properties can be identified and enforced. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The physics engine 104 can further utilize a presentation component 604 that provides various types of user interfaces to facilitate interaction between a user and any component coupled to the physics engine 104. As depicted, the presentation component 604 is a separate entity that can be utilized with the physics engine 104. However, it is to be appreciated that the presentation component 604 and/or similar view components can be incorporated into the physics engine 104 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the physics engine 104.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
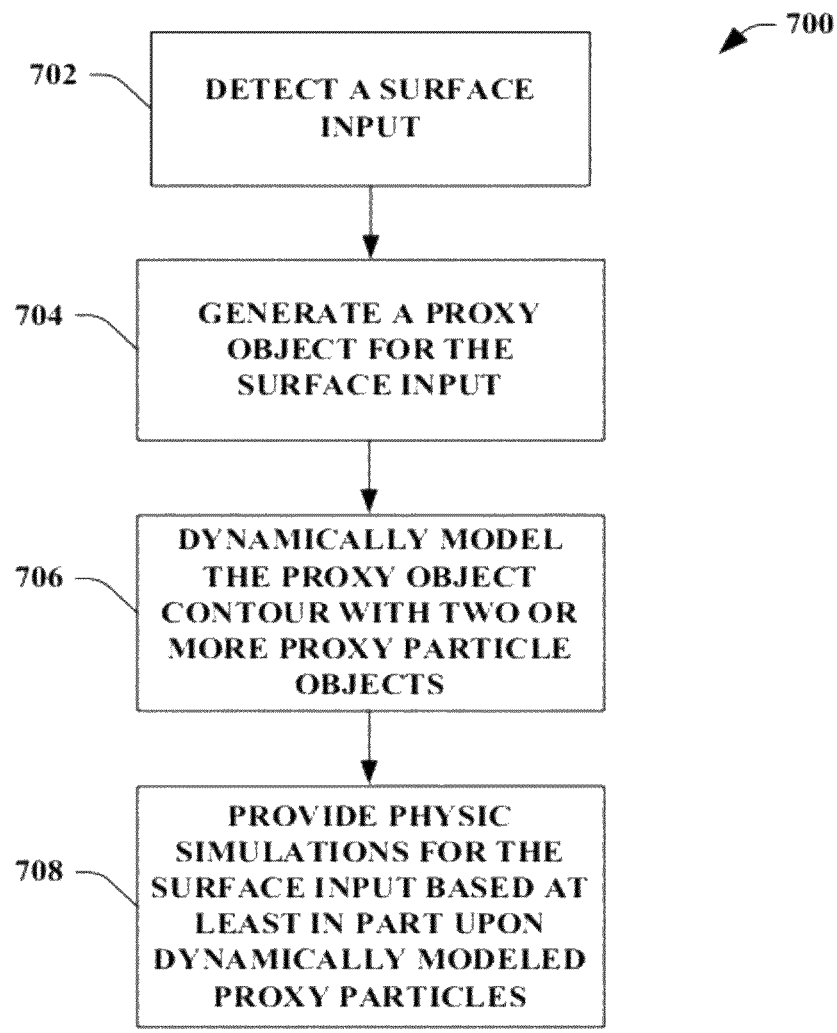
FIG. 7 illustrates an exemplary methodology for applying a physics quantity to an interaction between a data representation of a corporeal object and a surface input.
Figure 8:
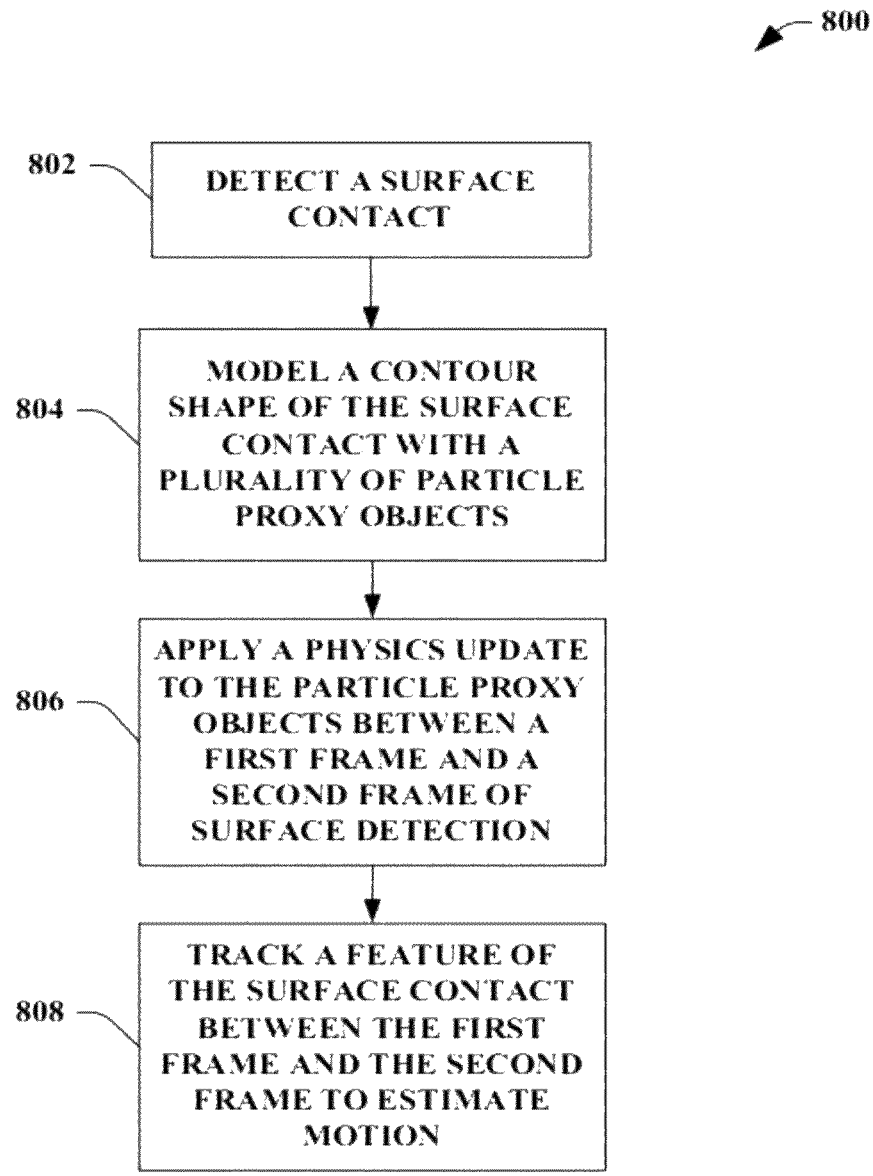
FIG. 8 illustrates an exemplary methodology that facilitates replicating Newtonian physics with data interaction associated with surface computing.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates applying a physics quantity to an interaction between a data representation of a corporeal object and a surface input. At reference numeral 702, a surface input can be detected. For example, any suitable image processing technique can be utilized in order to bring the collected surface input from a user into alignment with a projected image on a display. For instance, a surface input can be detected and a corresponding point in the projected image on the display can be calculated. In another example, a user's hands or fingers can be placed on a surface to which interaction with displayed data can be performed. In this example, the fingers or hands can manipulate the portion of displayed data in which such data can respond with physics-accurate results (e.g., force, mass, velocity, friction, etc.).

At reference numeral 704, a proxy object for the surface input can be generated. The proxy object can be mapped to any suitable detected surface input, wherein the surface input can be incorporated into a physics simulation. The proxy object can be created and positioned for each point of contact (e.g., surface input, detected gestures, movement, etc.). It is to be appreciated that the proxy object can enable collision with objects resting on the same plane as the touched object (e.g., the floor) but also objects that are in mid-air or stacked on other objects, etc.

At reference numeral 706, the proxy object contour can be dynamically modeled with two or more proxy particle objects. In general, a contact or surface input can be modeled by a plurality of proxy objects placed along a contour of such surface input and/or contact. For example, a finger tip can include a plurality of proxy objects around the contour of the surface input or contact of the finger tip on the surface. At reference numeral 708, physic simulations for the surface input can be provided based at least in part upon dynamically modeled proxy particles. In particular, a set of proxy objects for the contour at a beginning of each simulation frame can be created. Upon application of the physics simulation update, the proxy objects can be destroyed while enacting collision and/or friction forces during such update.

FIG. 8 illustrates a method 800 for replicating Newtonian physics with data interaction associated with surface computing. At reference numeral 802, a surface contact can be detected. For example, surface contact can be touch events, surface inputs, etc. related to a portion of displayed data. It is to be appreciated that such captured or detected events, inputs, or contacts can be gestures, hand-motions, hand interactions, object interactions, and/or any other interaction with a portion of data representative of a corporeal object. For example, hand interactions can be translated into corresponding data interactions on a display. In particular, a user can physically manipulate a portion of displayed data on a surface in which such hand gesture can be detected and translated in order for data interaction.

At reference numeral 804, a contour shape of the surface contact can be modeled with a plurality of particle proxy objects. At reference numeral 806, a physics update can be applied to the particle proxy objects between a first frame and a second frame of surface detection. By modeling surface contact contours, distribution and/or friction forces can be accurately modeled and/or employed. Additionally, each particle can be kinetically controlled to match movement of the contact to which it belongs. The physics update can be related to applying a physics quantity such as, but not limited to, mass, velocity, friction, force, etc. At reference numeral 808, a feature of the surface contact can be tracked between the first frame and the second frame in order to estimate motion.

Figure 9:
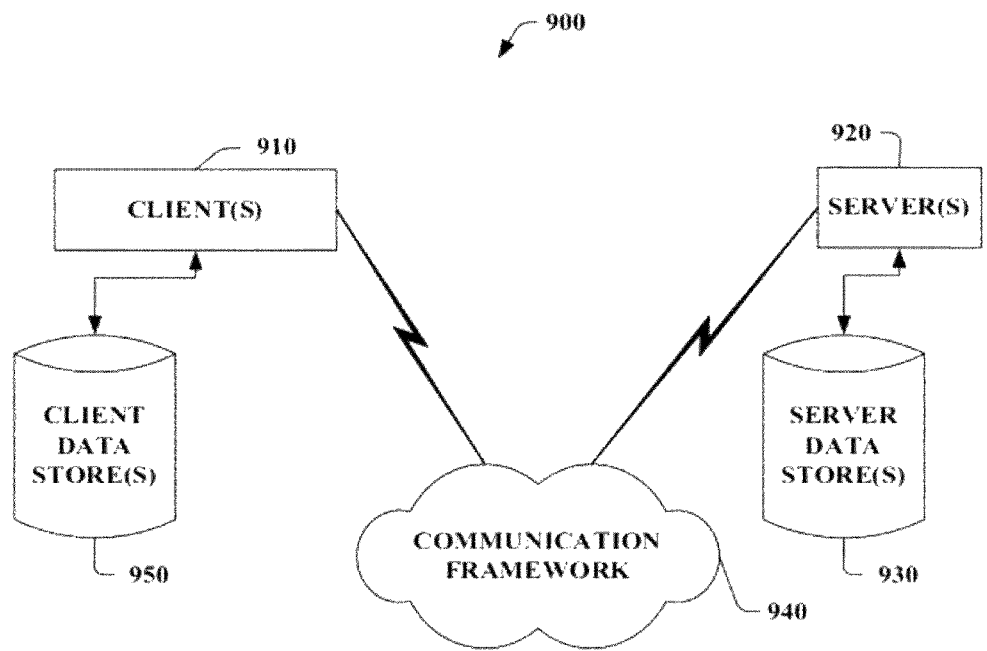
FIG. 9 illustrates an exemplary networking environment, wherein the novel aspects of the claimed subject matter can be employed.
Figure 10:
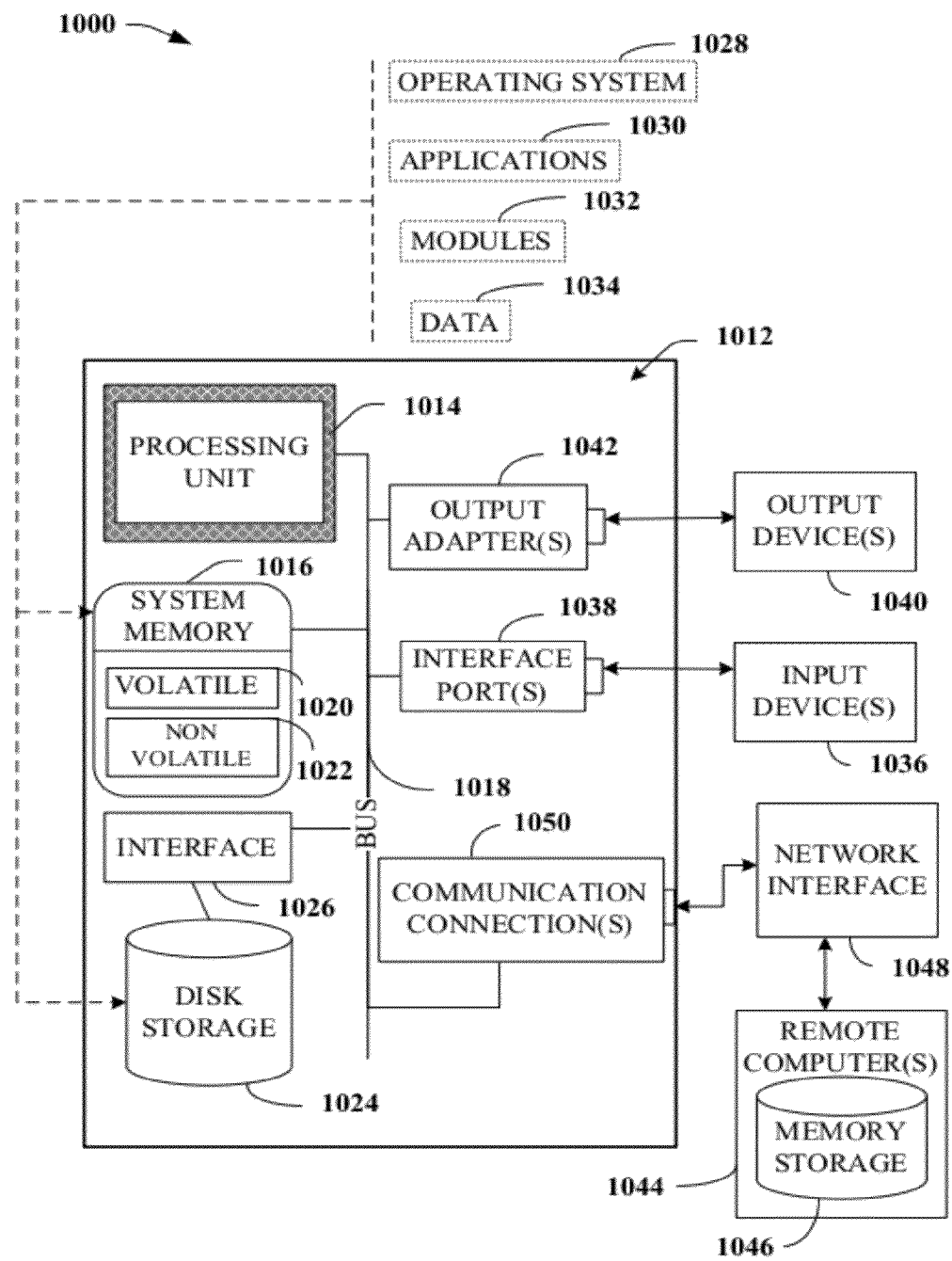
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a physics engine that can incorporate realistic physics to a portion of displayed data, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method comprising:
    under control of one or more processors configured with executable instructions:
    detecting a surface input;
    modeling a contour of the detected surface input using one or more virtual objects, the one or more virtual objects enabling interaction between the detected surface input and a displayed object or data on a display; and
    integrating a portion of physics laws via the one or more virtual objects into the interaction between the detected surface input and the displayed object or data to model a quantity related to the displayed object or data.

2. The method as recited in claim 1, wherein the quantity comprises a force, a mass, a velocity, a torque, and/or a friction.

3. The method as recited in claim 1, further comprising:
    generating a proxy object for the detected surface input; and
    calculating a motion of the proxy object by tracking a motion of the proxy object between a first frame and a second frame.

4. The method as recited in claim 3, further comprising kinetically controlling the proxy object to match the movement of the detected surface input.

5. The method as recited in claim 3, further comprising applying an amount of a force proportional to a number of proxies applied to the displayed object or data on the display.

6. The method as recited in claim 5, wherein the number of proxies is related to a surface area of the detected surface input.

7. The method as recited in claim 5, further comprising:
    sensing a surface pressure; and
    transducing the surface pressure to the force on the number of proxies.

8. A system comprising:
    one or more processors;
    memory, communicatively coupled to the one or more processors, storing executable instructions that, when executed by the one or more processors, configure the one or more processors to perform acts comprising:
    detecting a surface input;
    modeling a contour of the surface input using one or more virtual objects; and
    applying a physics update related to a portion of physics laws to at least one of the one or more virtual objects between a first frame and a second frame of surface input detection.

9. The system as recited in claim 8, the acts further comprising:
    generating a proxy object for the surface input; and
    calculating a motion of the proxy object by tracking a motion of the proxy object between the first frame and the second frame.

10. The system as recited in claim 8, the acts further comprising:
    enacting a collision force and/or a friction force with the physics update; and/or
    enacting a gathering and/or a pilling of a plurality of objects with the physics update.

11. The system as recited in claim 8, the acts further comprising enabling support for a soft body simulation, a cloth body simulation and/or a fluid simulation.

12. The system as recited in claim 8, the acts further comprising:
    displaying an object or data on a surface or display; and
    enabling an interaction between the surface input and at least a portion of the displayed object or data on the surface or display.

13. The system as recited in claim 12, wherein the display comprises a monitor, a television, a liquid crystal display (LCD), a plasma, a rear-projection display, a front-projection display, a cathode ray tube (CRT) monitor, a flat-panel, a display for a computing device, a portable digital assistance (PDA) screen, a laptop display, a computer monitor, a smartphone display, a cellular device screen, a mobile communication device display, or a portable gaming device display.

14. The system as recited in claim 8, the acts further comprising calculating a velocity of a virtual object of the one or more virtual objects using a block matching related to an optical flow.

15. One or more computer storage media storing executable instructions that, when executed by one or more processors, configure the one or more processors to perform acts comprising:
    detecting a surface input;
    modeling a contour of the surface input using one or more virtual objects; and
    applying a physics update related to a portion of physics laws to at least one of the one or more virtual objects between a first frame and a second frame of surface input detection.

16. The one or more computer storage media as recited in claim 15, the acts further comprising:
    generating a proxy object for the surface input, and
    calculating a motion of the proxy object by tracking a motion of the proxy object between the first frame and the second frame.

17. The one or more computer storage media as recited in claim 15, the acts further comprising:
    enacting a collision force and/or a friction force with the physics update; and/or
    enacting a gathering and/or a pilling of a plurality of objects with the physics update.

18. The one or more computer storage media as recited in claim 15, the acts further comprising enabling support for a soft body simulation, a cloth body simulation and/or a fluid simulation.

19. The one or more computer storage media as recited in claim 15, the acts further comprising:
    displaying an object or data on a surface or display; and
    enabling an interaction between the surface input and at least a portion of the displayed object or data on the surface or display.

20. The one or more computer storage media as recited in claim 19, wherein the display comprises a monitor, a television, a liquid crystal display (LCD), a plasma, a rear-projection display, a front-projection display, a cathode ray tube (CRT) monitor, a flat-panel, a display for a computing device, a portable digital assistance (PDA) screen, a laptop display, a computer monitor, a smartphone display, a cellular device screen, a mobile communication device display, or a portable gaming device display.

* * * * *